United States Patent
Kadoono et al.

(10) Patent No.: US 12,036,713 B2
(45) Date of Patent: Jul. 16, 2024

(54) INJECTION MOLDING MACHINE AND MANAGEMENT DEVICE FOR INJECTION MOLDING

(71) Applicant: SUMITOMO HEAVY INDUSTRIES, LTD., Tokyo (JP)

(72) Inventors: Tomosuke Kadoono, Chiba (JP); Tomohiro Hirano, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/068,068

(22) Filed: Dec. 19, 2022

(65) Prior Publication Data

US 2023/0311387 A1    Oct. 5, 2023

(30) Foreign Application Priority Data

Mar. 31, 2022   (JP) ................................. 2022-061040

(51) Int. Cl.
*B29C 45/76*    (2006.01)

(52) U.S. Cl.
CPC ............ *B29C 45/76* (2013.01); *B29C 45/766* (2013.01); *B29C 2045/7606* (2013.01); *B29C 2945/76076* (2013.01)

(58) Field of Classification Search
CPC .................. B29C 45/76; B29C 45/766; B29C 2045/7606; B29C 2945/76076
See application file for complete search history.

(56) References Cited

U.S. PATENT DOCUMENTS

| | | | |
|---|---|---|---|
| 3,766,795 A * | 10/1973 | Priest | B29C 45/76 |
| 5,455,773 A | 10/1995 | Frey | |
| 5,470,218 A | 11/1995 | Hillman et al. | |
| 2006/0246167 A1* | 11/2006 | Buja | B29C 45/77 425/549 |
| 2013/0103184 A1* | 4/2013 | Morikawa | B29C 45/76 700/197 |
| 2015/0290857 A1* | 10/2015 | Tajika | B29C 45/762 425/167 |
| 2020/0391422 A1 | 12/2020 | Giessauf | |

FOREIGN PATENT DOCUMENTS

| | | |
|---|---|---|
| DE | 43 10 332 A1 | 10/1994 |
| DE | 10 2019 105 230 A1 | 9/2019 |
| JP | 2015-044306 A | 3/2015 |

OTHER PUBLICATIONS

Office Action of the corresponding DE 10 2023 101 828.0 mailed on Apr. 11, 2024.

* cited by examiner

*Primary Examiner* — Alison L Hindenlang
*Assistant Examiner* — Shibin Liang
(74) *Attorney, Agent, or Firm* — WTA Patents

(57) ABSTRACT

It is possible to improve accuracy of calculated statistical information. An injection molding machine according to an embodiment includes: a display control unit configured to display an input field for a shot number indicating an injection molding cycle or for a time period in which the injection molding cycle is performed, for specifying a calculation target of statistical information based on a parameter related to injection molding.

9 Claims, 9 Drawing Sheets

FIG. 4

| | 1401 | | 1402 | | 1403 | | 1404 | |
|---|---|---|---|---|---|---|---|---|
| TOTAL NUMBER | 44 | shots | NON-DEFECTIVE PRODUCTS 44 | shots | DEFECTIVE 0 | shots | REJECTED 0 | shots |

STATISTICAL TARGET SETTING

| 1441 ☐ LATEST DATA | 1442 ☐ [ ] shots | 1443 ☐ SHOT NUMBER | 1444A [ ] TO | 1444B [ ] 1445 ☐ EXCLUSION NUMBER | 1446A [ ] TO | 1446B [ ] |

| | 1421 CYCLE TIME | 1422 FILLING TIME | 1423 PLASTICIZING TIME | 1424 MINIMUM CUSHION POSITION | 1425 FILLING PEAK PRESSURE | 1426 ENTIRE REGION PEAK PRESSURE | 1427 HOLDING PRESSURE COMPLETION POSITION | 1428 MOLD CLAMPING FORCE |
|---|---|---|---|---|---|---|---|---|
| AVERAGE | 372.807 | 7.3364 | 65.250 | 3.093 | 64.00 | 65.18 | 4.580 | 479.643 |
| RANGE | 4349.41 | 5.254 | 66.18 | 52.02 | 46.8 | 48.2 | 51.63 | 27.44 |
| MAXIMUM | 4349.41 | 7.356 | 88.75 | 54.98 | 64.0 | 65.3 | 56.04 | 502.41 |
| MINIMUM | 0.00 | 2.102 | 22.58 | 2.96 | 17.2 | 17.2 | 4.41 | 474.98 |
| STANDARD DEVIATION | 872.641 | 0.0072 | 6.715 | 0.047 | 0.01 | 0.08 | 0.047 | 1.025 |
| DEFECTIVE | 0 | 0 | 0 | 0 | 0 | 0 | 0 | 0 |
| MONITORING | OFF | OFF | OFF | OFF | OFF | OFF | OFF | OFF |
| CENTER | 0.00 | 0.00 | 0.00 | 0.00 | 0.00 | 0.00 | 0.00 | 0.00 |
| RANGE | 0.00 | 0.00 | 0.00 | 0.00 | 0.00 | 0.00 | 0.00 | 0.00 |

1405 LOGGING ON
1406 MONITORING OFF
1407 SAVE
UPDATE ALWAYS
1408

| SHOT NUMBER | TIME | STATE | CH1 | CH2 | CH3 | CH4 | CH5 | CH6 | CH7 | CH8 |
|---|---|---|---|---|---|---|---|---|---|---|
| 44 | 17:27:53 | | x.xx | x.xx | x.xx | x.xx | x.xx | x.xx | x.xx | x.xx |
| 43 | 17:24:04 | | x.xx | x.xx | x.xx | x.xx | x.xx | x.xx | x.xx | x.xx |
| 42 | 17:20:16 | | x.xx | x.xx | x.xx | x.xx | x.xx | x.xx | x.xx | x.xx |
| 41 | 17:16:27 | | x.xx | x.xx | x.xx | x.xx | x.xx | x.xx | x.xx | x.xx |
| 40 | 17:12:39 | | x.xx | x.xx | x.xx | x.xx | x.xx | x.xx | x.xx | x.xx |
| 39 | 17:08:50 | | x.xx | x.xx | x.xx | x.xx | x.xx | x.xx | x.xx | x.xx |
| 38 | 17:05:02 | | x.xx | x.xx | x.xx | x.xx | x.xx | x.xx | x.xx | x.xx |
| 37 | 17:01:14 | | x.xx | x.xx | x.xx | x.xx | x.xx | x.xx | x.xx | x.xx |
| 36 | 15:48:44 | | x.xx | x.xx | x.xx | x.xx | x.xx | x.xx | x.xx | x.xx |
| 35 | 15:44:56 | | x.xx | x.xx | x.xx | x.xx | x.xx | x.xx | x.xx | x.xx |
| 34 | 15:41:07 | | x.xx | x.xx | x.xx | x.xx | x.xx | x.xx | x.xx | x.xx |
| 33 | 15:37:19 | | x.xx | x.xx | x.xx | x.xx | x.xx | x.xx | x.xx | x.xx |
| 32 | 15:33:29 | | x.xx | x.xx | x.xx | x.xx | x.xx | x.xx | x.xx | x.xx |
| 31 | 15:29:40 | | x.xx | x.xx | x.xx | x.xx | x.xx | x.xx | x.xx | x.xx |

ACTUAL RESULT | ○○ | ×× | ×△ | △×

| SHOT NUMBER | | TIME | STATE | CH1 | CH2 | CH3 | CH4 | CH5 | CH6 | CH7 | CH8 |
|---|---|---|---|---|---|---|---|---|---|---|---|
| ☐ | 44 | 17:27:53 | | x.xx | x.xx | x.xx | x.xx | x.xx | x.xx | x.xx | x.xx |
| ☑ | 43 | 17:24:04 | | x.xx | x.xx | x.xx | x.xx | x.xx | x.xx | x.xx | x.xx |
| ☐ | 42 | 17:20:16 | | x.xx | x.xx | x.xx | x.xx | x.xx | x.xx | x.xx | x.xx |
| ☑ | 41 | 17:16:27 | | x.xx | x.xx | x.xx | x.xx | x.xx | x.xx | x.xx | x.xx |
| ☐ | 40 | 17:12:39 | | x.xx | x.xx | x.xx | x.xx | x.xx | x.xx | x.xx | x.xx |
| ☑ | 39 | 17:08:50 | | x.xx | x.xx | x.xx | x.xx | x.xx | x.xx | x.xx | x.xx |
| ☑ | 38 | 17:05:02 | | x.xx | x.xx | x.xx | x.xx | x.xx | x.xx | x.xx | x.xx |
| ☑ | 37 | 17:01:14 | | x.xx | x.xx | x.xx | x.xx | x.xx | x.xx | x.xx | x.xx |
| ☐ | 36 | 15:48:44 | | x.xx | x.xx | x.xx | x.xx | x.xx | x.xx | x.xx | x.xx |
| ☐ | 35 | 15:44:56 | | x.xx | x.xx | x.xx | x.xx | x.xx | x.xx | x.xx | x.xx |
| ☑ | 34 | 15:41:07 | | x.xx | x.xx | x.xx | x.xx | x.xx | x.xx | x.xx | x.xx |
| ☐ | 33 | 15:37:19 | | x.xx | x.xx | x.xx | x.xx | x.xx | x.xx | x.xx | x.xx |
| ☐ | 32 | 15:33:29 | | x.xx | x.xx | x.xx | x.xx | x.xx | x.xx | x.xx | x.xx |
| ☐ | 31 | 15:29:40 | | x.xx | x.xx | x.xx | x.xx | x.xx | x.xx | x.xx | x.xx |

FIG. 7

| SHOT NUMBER | TIME | STATE | CH1 | CH2 | CH3 | CH4 | CH5 | CH6 | CH7 | CH8 |
|---|---|---|---|---|---|---|---|---|---|---|
| 44 | 17:27:53 | | x.xx | x.xx | x.xx | x.xx | x.xx | x.xx | x.xx | x.xx |
| 43 | 17:24:04 | | x.xx | x.xx | x.xx | x.xx | x.xx | x.xx | x.xx | x.xx |
| 42 | 17:20:16 | | x.xx | x.xx | x.xx | x.xx | x.xx | x.xx | x.xx | x.xx |
| 41 | 17:16:27 | | x.xx | x.xx | x.xx | x.xx | x.xx | x.xx | x.xx | x.xx |
| 40 | 17:12:39 | | x.xx | x.xx | x.xx | x.xx | x.xx | x.xx | x.xx | x.xx |
| 39 | 17:08:50 | | x.xx | x.xx | x.xx | x.xx | x.xx | x.xx | x.xx | x.xx |
| 38 | 17:05:02 | | x.xx | x.xx | x.xx | x.xx | x.xx | x.xx | x.xx | x.xx |
| 37 | 17:01:14 | | x.xx | x.xx | x.xx | x.xx | x.xx | x.xx | x.xx | x.xx |
| 36 | 15:48:44 | | x.xx | x.xx | x.xx | x.xx | x.xx | x.xx | x.xx | x.xx |
| 35 | 15:44:56 | | x.xx | x.xx | x.xx | x.xx | x.xx | x.xx | x.xx | x.xx |
| 34 | 15:41:07 | | x.xx | x.xx | x.xx | x.xx | x.xx | x.xx | x.xx | x.xx |
| 33 | 15:37:19 | | x.xx | x.xx | x.xx | x.xx | x.xx | x.xx | x.xx | x.xx |
| 32 | 15:33:29 | | x.xx | x.xx | x.xx | x.xx | x.xx | x.xx | x.xx | x.xx |
| 31 | 15:29:40 | | x.xx | x.xx | x.xx | x.xx | x.xx | x.xx | x.xx | x.xx |

| | | CYCLE TIME (1421) | FILLING TIME (1422) | PLASTICIZING TIME (1423) | MINIMUM CUSHION POSITION (1424) | FILLING PEAK PRESSURE (1425) | ENTIRE REGION PEAK PRESSURE (1426) | HOLDING PRESSURE COMPLETION POSITION (1427) | MOLD CLAMPING FORCE (1428) |
|---|---|---|---|---|---|---|---|---|---|
| AVERAGE | | 372.807 | 7.3364 | 65.250 | 3.093 | 64.00 | 65.18 | 4.580 | 479.643 |
| RANGE | | 4349.41 | 5.254 | 66.18 | 52.02 | 46.8 | 48.2 | 51.63 | 27.44 |
| MAXIMUM | | 4349.41 | 7.356 | 88.75 | 54.98 | 64.0 | 65.3 | 56.04 | 502.41 |
| MINIMUM | | 0.00 | 2.102 | 22.58 | 2.96 | 17.2 | 17.2 | 4.41 | 474.98 |
| STANDARD DEVIATION | | 872.641 | 0.0072 | 6.715 | 0.047 | 0.01 | 0.08 | 0.047 | 1.025 |
| DEFECTIVE | | 0 | 0 | 0 | 0 | 0 | 0 | 0 | 0 |
| MONITORING | | OFF | OFF | OFF | OFF | OFF | OFF | OFF | OFF |
| CENTER | | 0.00 | 0.00 | 0.00 | 0.00 | 0.00 | 0.00 | 0.00 | 0.00 |
| RANGE | | 0.00 | 0.00 | 0.00 | 0.00 | 0.00 | 0.00 | 0.00 | 0.00 |

TOTAL NUMBER: 44 shots (1401) NON-DEFECTIVE PRODUCTS: 44 shots (1402) DEFECTIVE: 0 shots (1403) REJECTED: 0 shots (1404)

STATISTICAL TARGET SETTING
☐ LATEST DATA (1441) ☐ shots (1442) ☐ SHOT NUMBER (1443) [1444A] TO [1444B] ☐ EXCLUSION NUMBER (1445) [1446A] TO [1446B]

LOGGING ON (1405)
MONITORING OFF (1406)
SAVE UPDATE ALWAYS (1407)

| SHOT NUMBER | TIME | STATE | CH1 | CH2 | CH3 | CH4 | CH5 | CH6 | CH7 | CH8 |
|---|---|---|---|---|---|---|---|---|---|---|
| ☐ 44 | 17:27:53 | | x.xx | x.xx | x.xx | x.xx | x.xx | x.xx | x.xx | x.xx |
| ☐ 43 | 17:24:04 | | x.xx | x.xx | x.xx | x.xx | x.xx | x.xx | x.xx | x.xx |
| ☐ 42 | 17:20:16 | | x.xx | x.xx | x.xx | x.xx | x.xx | x.xx | x.xx | x.xx |
| ☐ 41 | 17:16:27 | | x.xx | x.xx | x.xx | x.xx | x.xx | x.xx | x.xx | x.xx |
| ☐ 40 | 17:12:39 | | x.xx | x.xx | x.xx | x.xx | x.xx | x.xx | x.xx | x.xx |
| ☐ 39 | 17:08:50 | | x.xx | x.xx | x.xx | x.xx | x.xx | x.xx | x.xx | x.xx |
| ☐ 38 | 17:05:02 | | 0.00 | x.xx | x.xx | x.xx | x.xx | x.xx | x.xx | x.xx |
| ☐ 37 | 17:01:14 | | x.xx | x.xx | x.xx | x.xx | x.xx | x.xx | x.xx | x.xx |
| ☐ 36 | 15:48:44 | | x.xx | x.xx | x.xx | x.xx | x.xx | x.xx | x.xx | x.xx |
| ☐ 35 | 15:44:56 | ⚠ | 4349.4 | x.xx | x.xx | x.xx | x.xx | x.xx | x.xx | x.xx |
| ☐ 34 | 15:41:07 | | x.xx | x.xx | x.xx | x.xx | x.xx | x.xx | x.xx | x.xx |
| ☐ 33 | 15:37:19 | | x.xx | x.xx | x.xx | x.xx | x.xx | x.xx | x.xx | x.xx |
| ☐ 32 | 15:33:29 | ⚠ | 3101.1 | x.xx | x.xx | x.xx | x.xx | x.xx | x.xx | x.xx |
| ☐ 31 | 15:29:40 | | x.xx | x.xx | x.xx | x.xx | x.xx | x.xx | x.xx | x.xx |

ACTUAL RESULT (1491)   ○○   ××   ×△   △×

FIG. 9

| | | 1421 CYCLE TIME | 1422 FILLING TIME | 1423 PLASTICIZING TIME | 1424 MINIMUM CUSHION POSITION | 1425 FILLING PEAK PRESSURE | 1426 ENTIRE REGION PEAK PRESSURE | 1427 HOLDING PRESSURE COMPLETION POSITION | 1428 MOLD CLAMPING FORCE |
|---|---|---|---|---|---|---|---|---|---|
| | AVERAGE | 372.807 | 7.3364 | 65.250 | 3.093 | 64.00 | 65.18 | 4.580 | 479.643 |
| | RANGE | 4349.41 | 5.254 | 66.18 | 52.02 | 46.8 | 48.2 | 51.63 | 27.44 |
| | MAXIMUM | 4349.41 | 7.356 | 88.75 | 54.98 | 64.0 | 65.3 | 56.04 | 502.41 |
| | MINIMUM | 0.00 | 2.102 | 22.58 | 2.96 | 17.2 | 17.2 | 4.41 | 474.98 |
| | STANDARD DEVIATION | 872.641 | 0.0072 | 6.715 | 0.047 | 0.01 | 0.08 | 0.047 | 1.025 |
| | DEFECTIVE | 0 | 0 | 0 | 0 | 0 | 0 | 0 | 0 |
| | MONITORING | OFF | OFF | OFF | OFF | OFF | OFF | OFF | OFF |
| | CENTER | 0.00 | 0.00 | 0.00 | 0.00 | 0.00 | 0.00 | 0.00 | 0.00 |
| | RANGE | 0.00 | 0.00 | 0.00 | 0.00 | 0.00 | 0.00 | 0.00 | 0.00 |

1401 TOTAL NUMBER: 44 shots
1402 NON-DEFECTIVE PRODUCTS: 44 shots
1403 DEFECTIVE: 0 shots
1404 REJECTED: 0 shots STATISTICAL TARGET SETTING
- 1441 ☐ LATEST DATA
- 1442 ☐ shots
- 1443 ☐ SHOT NUMBER
- 1444A ☐ TO 1444B ☐
- 1845 ☑ EXCLUSION NUMBER
- 1846A 43 TO 1846B 43

1405 LOGGING ON
1406 MONITORING OFF
1407 SAVE
UPDATE ALWAYS
1408

| SHOT NUMBER | TIME | STATE | CH1 | CH2 | CH3 | CH4 | CH5 | CH6 | CH7 | CH8 |
|---|---|---|---|---|---|---|---|---|---|---|
| 44 | 17:27:53 | | x.xx | x.xx | x.xx | x.xx | x.xx | x.xx | x.xx | x.xx |
| 43 | 17:24:04 | | x.xx | x.xx | x.xx | x.xx | x.xx | x.xx | x.xx | x.xx |
| 42 | 17:20:16 | | x.xx | x.xx | x.xx | x.xx | x.xx | x.xx | x.xx | x.xx |
| 41 | 17:16:27 | | x.xx | x.xx | x.xx | x.xx | x.xx | x.xx | x.xx | x.xx |
| 40 | 17:12:39 | | x.xx | x.xx | x.xx | x.xx | x.xx | x.xx | x.xx | x.xx |
| 39 | 17:08:50 | | x.xx | x.xx | x.xx | x.xx | x.xx | x.xx | x.xx | x.xx |
| 38 | 17:05:02 | | x.xx | x.xx | x.xx | x.xx | x.xx | x.xx | x.xx | x.xx |
| 37 | 17:01:14 | | x.xx | x.xx | x.xx | x.xx | x.xx | x.xx | x.xx | x.xx |
| 36 | 15:48:44 | | x.xx | x.xx | x.xx | x.xx | x.xx | x.xx | x.xx | x.xx |
| 35 | 15:44:56 | | x.xx | x.xx | x.xx | x.xx | x.xx | x.xx | x.xx | x.xx |
| 34 | 15:41:07 | | x.xx | x.xx | x.xx | x.xx | x.xx | x.xx | x.xx | x.xx |
| 33 | 15:37:19 | | x.xx | x.xx | x.xx | x.xx | x.xx | x.xx | x.xx | x.xx |
| 32 | 15:33:29 | | x.xx | x.xx | x.xx | x.xx | x.xx | x.xx | x.xx | x.xx |
| 31 | 15:29:40 | | x.xx | x.xx | x.xx | x.xx | x.xx | x.xx | x.xx | x.xx |

1491 ACTUAL RESULT: ○○  ××  ×△  △×

INJECTION MOLDING MACHINE AND MANAGEMENT DEVICE FOR INJECTION MOLDING

CROSS-REFERENCE TO RELATED APPLICATIONS

This application claims priority to Japanese Patent Application No. 2022-061040, filed on Mar. 31, 2022, which is incorporated by reference herein in its entirety.

BACKGROUND

Technical Field

Certain embodiments of the present invention relate to an injection molding machine and a management device for injection molding.

Description of Related Art

Hitherto, in an injection molding machine, a technique has been proposed in which results measured in various processes during injection molding are collected, and statistical information calculated based on the collected information is displayed on a display device. For example, the related art proposes a technique for improving abnormality detection accuracy by excluding a period in which an execution torque value is unstable and adopting a stable execution torque value.

SUMMARY

According to an embodiment of the present invention, there is provided a technique in which a decrease in accuracy of statistical information is suppressed by enabling an input for excluding information relating to a shot having a possibility of abnormality.

An injection molding machine according to an aspect of the present invention includes: a display control unit configured to display an input field for a shot number indicating an injection molding cycle or for a time period in which the injection molding cycle is performed, for specifying a calculation target of statistical information based on a parameter related to injection molding.

According to the aspect of the present invention, a range for calculating the statistical information can be set, so that accuracy of the calculated statistical information is improved.

BRIEF DESCRIPTION OF THE DRAWINGS

FIG. 4 is a view illustrating a log information screen output by a display control unit according to the embodiment.

FIG. 6 is a view illustrating another aspect of an actual result list included in the log information screen output by the display control unit according to the embodiment.

FIG. 7 is a view illustrating another aspect of the actual result list included in the log information screen output by the display control unit according to the embodiment.

FIG. 8 is a view illustrating another aspect of the log information screen output by the display control unit according to the embodiment.

FIG. 9 is a view illustrating the log information screen output by the display control unit according to the embodiment.

DETAILED DESCRIPTION

Figure 1:
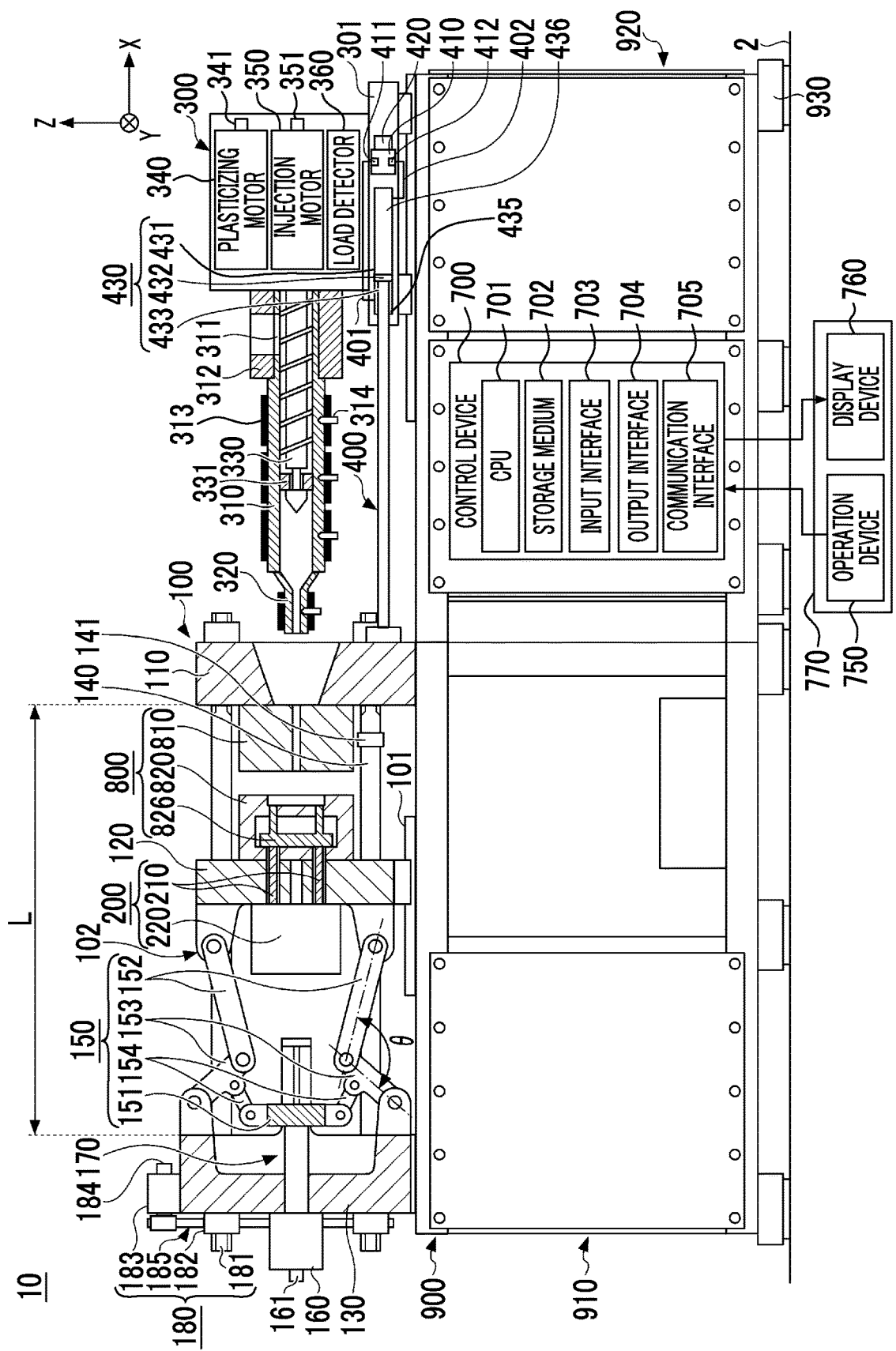
FIG. 1 is a view showing a state when mold opening is completed in an injection molding machine according to an embodiment.

In the related art, calculation accuracy of the torque value in one shot can be increased by excluding the period in which the execution torque value is unstable, and adopting the stable execution torque value. However, there is a possibility that the one shot is abnormal to begin with. Therefore, the accuracy of the statistical information is still low.

Hereinafter, embodiments of the present invention will be described with reference to the drawings. In addition, the embodiments described below are merely examples that do not limit the invention, and all the features and combinations thereof described in the embodiments are not necessarily essential to the invention. In each drawing, the same or corresponding reference numerals will be assigned to the same or corresponding configurations, and description thereof will be omitted.

Figure 2:
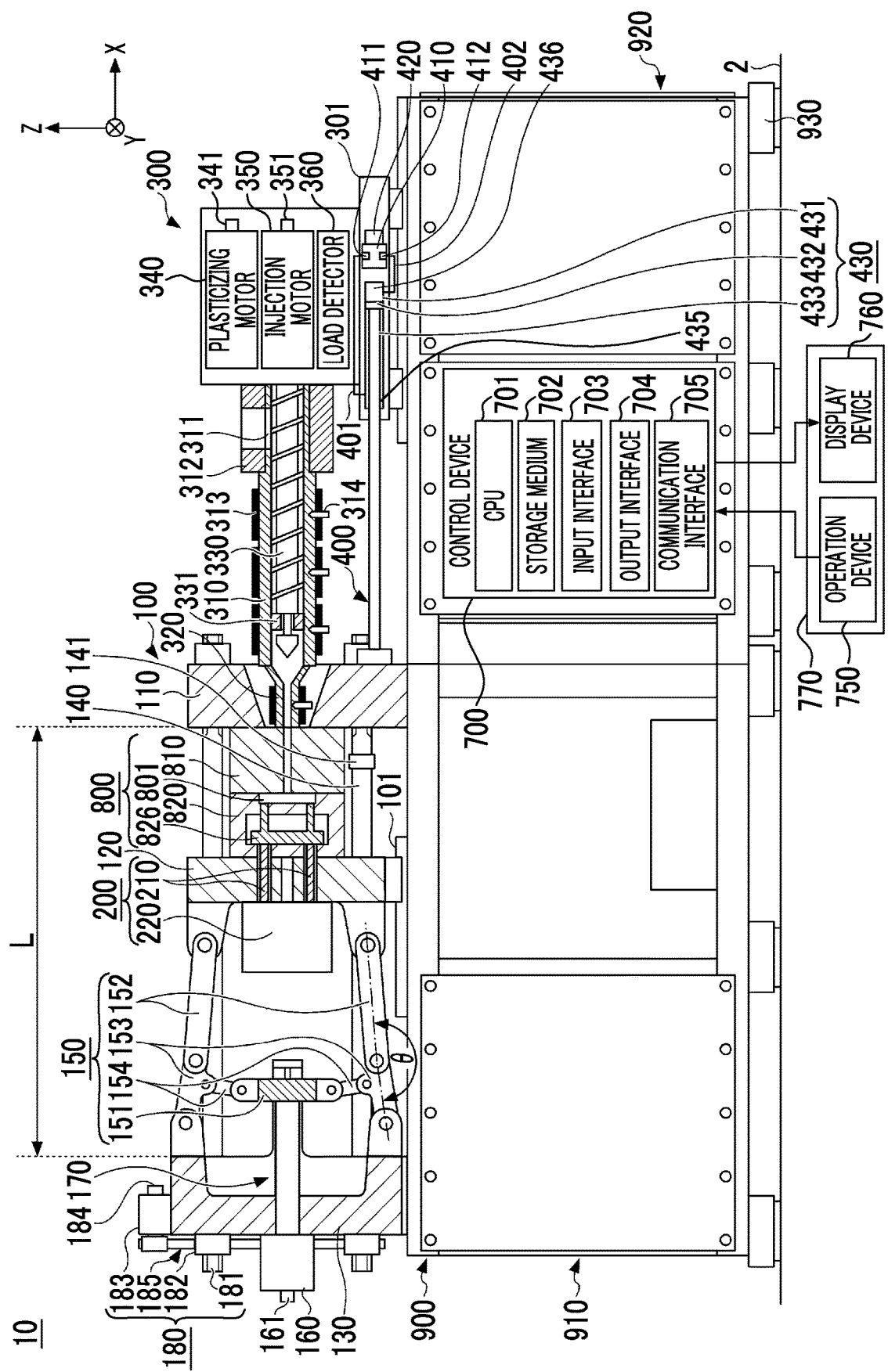
FIG. 2 is a view showing a state when mold clamping is performed in the injection molding machine according to the embodiment.

FIG. 1 is a view showing a state when mold opening is completed in an injection molding machine according to an embodiment. FIG. 2 is a view showing a state when mold clamping is performed in the injection molding machine according to the embodiment. In the present specification, an X-axis direction, a Y-axis direction, and a Z-axis direction are perpendicular to each other. The X-axis direction and the Y-axis direction represent a horizontal direction, and the Z-axis direction represents a vertical direction. In a case where a mold clamping unit 100 is of a horizontal type, the X-axis direction represents a mold opening and closing direction, and the Y-axis direction represents a width direction of an injection molding machine 10. A negative side in the Y-axis direction will be referred to as an operation side, and a positive side in the Y-axis direction will be referred to as a counter operation side.

As shown in FIGS. 1 and 2, the injection molding machine 10 includes the mold clamping unit 100 that opens and closes a mold unit 800, an ejector unit 200 that ejects a molding product molded by the mold unit 800, an injection unit 300 that injects a molding material into the mold unit 800, a moving unit 400 that causes the injection unit 300 to advance and retreat with respect to the mold unit 800, a control device 700 that controls each component of the injection molding machine 10, and a frame 900 that supports each component of the injection molding machine 10. The frame 900 includes a mold clamping unit frame 910 that supports the mold clamping unit 100, and an injection unit frame 920 that supports the injection unit 300. The mold clamping unit frame 910 and the injection unit frame 920 are respectively installed on a floor 2 via a leveling adjuster 930. The control device 700 is disposed in an internal space of the injection unit frame 920. Hereinafter, each component of the injection molding machine 10 will be described.

Mold Clamping Unit

In describing the mold clamping unit 100, a moving direction of a movable platen 120 during mold closing (for example, a positive direction of an X-axis) will be defined as forward, and a moving direction of the movable platen 120 during mold opening (for example, a negative direction of the X-axis) will be defined as rearward.

The mold clamping unit 100 performs mold closing, pressurizing, mold clamping, depressurizing, and mold opening of the mold unit 800. The mold unit 800 includes a stationary mold 810 and a movable mold 820. For example, the mold clamping unit 100 is of a horizontal type, and the mold opening and closing direction is a horizontal direction. The mold clamping unit 100 includes a stationary platen 110 to which the stationary mold 810 is attached, the movable platen 120 to which the movable mold 820 is attached, and a moving mechanism 102 that moves the movable platen 120 in the mold opening and closing direction with respect to the stationary platen 110.

The stationary platen 110 is fixed to the mold clamping unit frame 910. The stationary mold 810 is attached to a surface of the stationary platen 110 facing the movable platen 120.

The movable platen 120 is disposed to be movable in the mold opening and closing direction with respect to the mold clamping unit frame 910. A guide 101 that guides the movable platen 120 is laid on the mold clamping unit frame 910. The movable mold 820 is attached to a surface of the movable platen 120 facing the stationary platen 110.

The moving mechanism 102 causes the movable platen 120 to advance and retreat with respect to the stationary platen 110 such that mold closing, pressurizing, mold clamping, depressurizing, and mold opening of the mold unit 800 are performed. The moving mechanism 102 includes a toggle support 130 disposed at an interval from the stationary platen 110, a tie bar 140 that connects the stationary platen 110 and the toggle support 130 to each other, a toggle mechanism 150 that moves the movable platen 120 in the mold opening and closing direction with respect to the toggle support 130, a mold clamping motor 160 that operates the toggle mechanism 150, a motion conversion mechanism 170 that converts a rotary motion into a linear motion of the mold clamping motor 160, and a mold space adjustment mechanism 180 that adjusts an interval between the stationary platen 110 and the toggle support 130.

The toggle support 130 is disposed at an interval from the stationary platen 110, and is placed on the mold clamping unit frame 910 to be movable in the mold opening and closing direction. The toggle support 130 may be disposed to be movable along a guide laid on the mold clamping unit frame 910. The guide of the toggle support 130 may be common to the guide 101 of the movable platen 120.

In the present embodiment, the stationary platen 110 is fixed to the mold clamping unit frame 910, and the toggle support 130 is disposed to be movable in the mold opening and closing direction with respect to the mold clamping unit frame 910. However, the toggle support 130 may be fixed to the mold clamping unit frame 910, and the stationary platen 110 may be disposed to be movable in the mold opening and closing direction with respect to the mold clamping unit frame 910.

The tie bar 140 connects the stationary platen 110 and the toggle support 130 to each other at an interval L in the mold opening and closing direction. A plurality of (for example, four) tie bars 140 may be used. The plurality of tie bars 140 are disposed parallel to each other in the mold opening and closing direction, and extend in accordance with a mold clamping force. At least one of the tie bars 140 may be provided with a tie bar strain detector 141 that measures a strain of the tie bar 140. The tie bar strain detector 141 transmits a signal indicating a measurement result thereof to the control device 700. The measurement result of the tie bar strain detector 141 is used in measuring the mold clamping force.

In the present embodiment, as a mold clamping force detector for measuring the mold clamping force, the tie bar strain detector 141 is used. However, the present invention is not limited thereto. The mold clamping force detector is not limited to a strain gauge type. The mold clamping force detector may be of a piezoelectric type, a capacitive type, a hydraulic type, or an electromagnetic type, and an attachment position thereof is not limited to the tie bar 140.

The toggle mechanism 150 is disposed between the movable platen 120 and the toggle support 130, and moves the movable platen 120 in the mold opening and closing direction with respect to the toggle support 130. The toggle mechanism 150 has a crosshead 151 that moves in the mold opening and closing direction, and a pair of link groups bent and stretched by a movement of the crosshead 151. Each of the pair of link groups has a first link 152 and a second link 153 which are connected to be freely bent and stretched by a pin. The first link 152 is oscillatingly attached to the movable platen 120 by a pin. The second link 153 is oscillatingly attached to the toggle support 130 by a pin. The second link 153 is attached to the crosshead 151 via a third link 154. When the crosshead 151 is caused to advance and retreat with respect to the toggle support 130, the first link 152 and the second link 153 are bent and stretched, and the movable platen 120 advances and retreats with respect to the toggle support 130.

A configuration of the toggle mechanism 150 is not limited to configurations shown in FIGS. 1 and 2. For example, in FIGS. 1 and 2, the number of nodes in each link group is five, but may be four. One end portion of the third link 154 may be connected to the node between the first link 152 and the second link 153. The mold clamping motor 160 is attached to the toggle support 130, and operates the toggle mechanism 150. The mold clamping motor 160 causes the crosshead 151 to advance and retreat with respect to the toggle support 130 such that the first link 152 and the second link 153 are bent and stretched and the movable platen 120 advances and retreats with respect to the toggle support 130. The mold clamping motor 160 is directly connected to the motion conversion mechanism 170, but may be connected to the motion conversion mechanism 170 via a belt or a pulley.

The motion conversion mechanism 170 converts a rotary motion of the mold clamping motor 160 into a linear motion of the crosshead 151. The motion conversion mechanism 170 includes a screw shaft and a screw nut screwed to the screw shaft. A ball or a roller may be interposed between the screw shaft and the screw nut.

The mold clamping unit 100 performs a mold closing process, a pressurizing process, a mold clamping process, a depressurizing process, and a mold opening process under the control of the control device 700.

In the mold closing process, the mold clamping motor 160 is driven to cause the crosshead 151 to advance to a mold closing completion position at a set movement speed, thereby causing the movable platen 120 to advance such that the movable mold 820 touches the stationary mold 810. For example, a position or a movement speed of the crosshead 151 is measured by using a mold clamping motor encoder 161. The mold clamping motor encoder 161 measures rotation of the mold clamping motor 160, and transmits a signal indicating a measurement result thereof to the control device 700.

A crosshead position detector for measuring a position of the crosshead 151 and a crosshead movement speed detector for measuring a movement speed of the crosshead 151 are not limited to the mold clamping motor encoder 161, and a general detector can be used. In addition, a movable platen position detector for measuring a position of the movable platen 120 and a movable platen movement speed detector for measuring a movement speed of the movable platen 120 are not limited to the mold clamping motor encoder 161, and a general detector can be used.

In the pressurizing process, the mold clamping motor 160 is further driven to cause the crosshead 151 to further advance from the mold closing completion position to a mold clamping position, thereby generating a mold clamping force.

In the mold clamping process, the mold clamping motor 160 is driven to maintain the position of the crosshead 151 at the mold clamping position. In the mold clamping process, the mold clamping force generated in the pressurizing process is maintained. In the mold clamping process, a cavity space 801 (refer to FIG. 2) is formed between the movable mold 820 and the stationary mold 810, and the injection unit 300 fills the cavity space 801 with a liquid molding material. A molding product is obtained by solidifying the molding material filled therein.

The number of the cavity spaces 801 may be one or more. In the latter case, a plurality of the molding products can be obtained at the same time. An insert material may be disposed in a portion of the cavity space 801, and the other portion of the cavity space 801 may be filled with the molding material. A molding product in which the insert material and the molding material are integrated with each other can be obtained.

In the depressurizing process, the mold clamping motor 160 is driven to cause the crosshead 151 to retreat from the mold clamping position to a mold opening start position such that the movable platen 120 retreats to reduce the mold clamping force. The mold opening start position and the mold closing completion position may be the same position.

In the mold opening process, the mold clamping motor 160 is driven to cause the crosshead 151 to retreat from the mold opening start position to a mold opening completion position at a set movement speed such that the movable platen 120 retreats and the movable mold 820 is separated from the stationary mold 810. Thereafter, the ejector unit 200 ejects the molding product from the movable mold 820.

Setting conditions in the mold closing process, the pressurizing process, and the mold clamping process are collectively set as a series of setting conditions. For example, the movement speed or positions (including a mold closing start position, a movement speed switching position, the mold closing completion position, and the mold clamping position) of the crosshead 151 and the mold clamping force in the mold closing process and in the pressurizing process are collectively set as a series of setting conditions. The mold closing start position, the movement speed switching position, the mold closing completion position, and the mold clamping position are aligned in this order from a rear side toward a front side, and represent a start point and an end point of a section in which the movement speed is set. The movement speed is set for each section. The number of the movement speed switching positions may be one or more. The movement speed switching position may not be set. Only one of the mold clamping position and the mold clamping force may be set.

The setting conditions in the depressurizing process and in the mold opening process are set in the same manner. For example, the movement speed or positions (the mold opening start position, the movement speed switching position, and the mold opening completion position) of the crosshead 151 in the depressurizing process and in the mold opening process are collectively set as a series of setting conditions. The mold opening start position, the movement speed switching position, and the mold opening completion position are aligned in this order from the front side toward the rear side, and represent the start point and the end point of the section in which the movement speed is set. The movement speed is set for each section. The number of the movement speed switching positions may be one or more. The movement speed switching position may not be set. The mold opening start position and the mold closing completion position may be the same position. In addition, the mold opening completion position and the mold closing start position may be the same position.

Instead of the movement speed, positions, and the like of the crosshead 151, the movement speed, positions, and the like of the movable platen 120 may be set. In addition, instead of the position (for example, the mold clamping position) of the crosshead or the position of the movable platen, the mold clamping force may be set. The toggle mechanism 150 amplifies a driving force of the mold clamping motor 160, and transmits the driving force to the movable platen 120. An amplification magnification is referred to as a toggle magnification. The toggle magnification is changed according to an angle θ (hereinafter, also referred to as a "link angle θ") formed between the first link 152 and the second link 153. The link angle θ is obtained from the position of the crosshead 151. When the link angle θ is 180°, the toggle magnification is maximized.

In a case where a mold space of the mold unit 800 is changed due to replacement of the mold unit 800 or a temperature change in the mold unit 800, mold space adjustment is performed so that a predetermined mold clamping force is obtained during the mold clamping. For example, in the mold space adjustment, the interval L between the stationary platen 110 and the toggle support 130 is adjusted so that the link angle θ of the toggle mechanism 150 becomes a predetermined angle at a mold touch time at which the movable mold 820 touches the stationary mold 810.

The mold clamping unit 100 has the mold space adjustment mechanism 180. The mold space adjustment mechanism 180 performs the mold space adjustment by adjusting the interval L between the stationary platen 110 and the toggle support 130. For example, a time for the mold space adjustment is determined from an end point of a molding cycle to a start point of a subsequent molding cycle. For example, the mold space adjustment mechanism 180 has a screw shaft 181 formed in a rear end portion of the tie bar 140, a screw nut 182 held by the toggle support 130 to be rotatable and not to advance and retreat, and a mold space adjustment motor 183 that rotates the screw nut 182 screwed to the screw shaft 181.

The screw shaft 181 and the screw nut 182 are provided for each of the tie bars 140. A rotational driving force of the mold space adjustment motor 183 may be transmitted to a plurality of the screw nuts 182 via a rotational driving force transmitting unit 185. The plurality of screw nuts 182 can be rotated in synchronization with each other. The plurality of screw nuts 182 can be individually rotated by changing a transmission channel of the rotational driving force transmitting unit 185.

For example, the rotational driving force transmitting unit 185 is configured to include a gear. In this case, a driven gear is formed on an outer periphery of each screw nut 182, a driving gear is attached to an output shaft of the mold space adjustment motor 183, and a plurality of intermediate gears meshing with the driven gear and the driving gear are held to be rotatable in a central portion of the toggle support 130. The rotational driving force transmitting unit 185 may be configured to include a belt or a pulley instead of the gear.

An operation of the mold space adjustment mechanism 180 is controlled by the control device 700. The control device 700 drives the mold space adjustment motor 183 to rotate the screw nut 182. As a result, a position of the toggle support 130 with respect to the tie bar 140 is adjusted, and the interval L between the stationary platen 110 and the toggle support 130 is adjusted. In addition, a plurality of the mold space adjustment mechanisms may be used in combination.

The interval L is measured by using a mold space adjustment motor encoder 184. The mold space adjustment motor encoder 184 measures a rotation amount or a rotation direction of the mold space adjustment motor 183, and transmits a signal indicating a measurement result thereof to the control device 700. The measurement result of the mold space adjustment motor encoder 184 is used in monitoring or controlling the position or the interval L of the toggle support 130. A toggle support position detector for measuring the position of the toggle support 130 and an interval detector for measuring the interval L are not limited to the mold space adjustment motor encoder 184, and a general detector can be used.

The mold clamping unit 100 may include a mold temperature controller that adjusts the temperature of the mold unit 800. The mold unit 800 internally has a flow path of a temperature control medium. The mold temperature controller adjusts the temperature of the mold unit 800 by adjusting a temperature of the temperature control medium supplied to the flow path of the mold unit 800. The mold clamping unit 100 of the present embodiment is of the horizontal type in which the mold opening and closing direction is the horizontal direction, but may be of a vertical type in which the mold opening and closing direction is an upward-downward direction.

The mold clamping unit 100 of the present embodiment has the mold clamping motor 160 as a drive source. However, a hydraulic cylinder may be provided instead of the mold clamping motor 160. In addition, the mold clamping unit 100 may have a linear motor for mold opening and closing, and may have an electromagnet for mold clamping.

Ejector Unit

In describing the ejector unit 200, similarly to the description of the mold clamping unit 100, a moving direction of the movable platen 120 during the mold closing (for example, the positive direction of the X-axis) will be defined as forward, and a moving direction of the movable platen 120 during the mold opening (for example, the negative direction of the X-axis) will be defined as rearward.

The ejector unit 200 is attached to the movable platen 120, and advances and retreats together with the movable platen 120. The ejector unit 200 has an ejector rod 210 that ejects a molding product from the mold unit 800, and a drive mechanism 220 that moves the ejector rod 210 in the moving direction (X-axis direction) of the movable platen 120.

The ejector rod 210 is disposed to be able to advance and retreat in a through-hole of the movable platen 120. A front end portion of the ejector rod 210 comes into contact with an ejector plate 826 of the movable mold 820. The front end portion of the ejector rod 210 may be connected to or may not be connected to the ejector plate 826.

For example, the drive mechanism 220 has an ejector motor and a motion conversion mechanism that converts a rotary motion of the ejector motor into a linear motion of the ejector rod 210. The motion conversion mechanism includes a screw shaft and a screw nut screwed to the screw shaft. A ball or a roller may be interposed between the screw shaft and the screw nut.

The ejector unit 200 performs an ejection process under the control of the control device 700. In the ejection process, the ejector rod 210 is caused to advance from a standby position to an ejection position at a set movement speed such that the ejector plate 826 advances to eject the molding product. Thereafter, the ejector motor is driven to cause the ejector rod 210 to retreat at a set movement speed such that the ejector plate 826 retreats to an original standby position.

For example, a position or a movement speed of the ejector rod 210 is measured by using an ejector motor encoder. The ejector motor encoder measures the rotation of the ejector motor, and transmits a signal indicating a measurement result thereof to the control device 700. An ejector rod position detector for measuring the position of the ejector rod 210, and an ejector rod movement speed detector for measuring the movement speed of the ejector rod 210 are not limited to the ejector motor encoder, and a general detector can be used.

Injection Unit

In describing the injection unit 300, unlike the description of the mold clamping unit 100 or the description of the ejector unit 200, a moving direction of a screw 330 during filling (for example, the negative direction of the X-axis) will be defined as forward, and a moving direction of the screw 330 during plasticizing (for example, the positive direction of the X-axis) will be defined as rearward.

The injection unit 300 is installed on a slide base 301, and the slide base 301 is disposed to be able to advance and retreat with respect to the injection unit frame 920. The injection unit 300 is disposed to be able to advance and retreat with respect to the mold unit 800. The injection unit 300 touches the mold unit 800, and fills the cavity space 801 inside the mold unit 800 with the molding material plasticized inside a cylinder 310. For example, the injection unit 300 has the cylinder 310 that heats the molding material, a nozzle 320 provided in a front end portion of the cylinder 310, the screw 330 disposed to be able to advance and retreat and to rotate inside the cylinder 310, a plasticizing motor 340 that rotates the screw 330, an injection motor 350 that causes the screw 330 to advance and retreat, and a load detector 360 that measures a load transmitted between the injection motor 350 and the screw 330.

The cylinder 310 heats the molding material supplied into the cylinder 310 from a feed port 311. For example, the molding material includes a resin. For example, the molding material is formed in a pellet shape, and is supplied to the feed port 311 in a solid state. The feed port 311 is formed in a rear portion of the cylinder 310. A cooler 312 such as a water-cooling cylinder is provided on an outer periphery of the rear portion of the cylinder 310. In front of the cooler 312, a heating unit 313 such as a band heater and a temperature measurer 314 are provided on an outer periphery of the cylinder 310.

The cylinder 310 is divided into a plurality of zones in an axial direction (for example, the X-axis direction) of the cylinder 310. The heating unit 313 and the temperature measurer 314 are provided in each of the plurality of zones. The control device 700 controls the heating unit 313 so that a set temperature is set in each of the plurality of zones and a measurement temperature of the temperature measurer 314 reaches the set temperature.

The nozzle 320 is provided in a front end portion of the cylinder 310, and is pressed against the mold unit 800. The heating unit 313 and the temperature measurer 314 are provided on an outer periphery of the nozzle 320. The control device 700 controls the heating unit 313 so that a measurement temperature of the nozzle 320 reaches the set temperature.

The screw 330 is disposed to be able to rotate and to advance and retreat inside the cylinder 310. When the screw 330 is rotated, the molding material is fed forward along a helical groove of the screw 330. The molding material is gradually melted by heat from the cylinder 310 while being fed forward. As the liquid molding material is fed forward of the screw 330 and is accumulated in a front portion of the cylinder 310, the screw 330 retreats. Thereafter, when the screw 330 is caused to advance, the liquid molding material accumulated in front of the screw 330 is injected from the nozzle 320, and fills an inside of the mold unit 800.

As a backflow prevention valve for preventing a backflow of the molding material fed rearward from the front of the screw 330 when the screw 330 is pressed forward, a backflow prevention ring 331 is attached to a front portion of the screw 330 to be able to advance and retreat.

The backflow prevention ring 331 is pressed rearward by a pressure of the molding material in front of the screw 330 when the screw 330 is caused to advance, and retreats relative to the screw 330 to a close position (refer to FIG. 2) at which a flow path of the molding material is closed. Accordingly, the molding material accumulated in front of the screw 330 is prevented from flowing rearward.

On the other hand, the backflow prevention ring 331 is pressed forward by the pressure of the molding material fed forward along the helical groove of the screw 330 when the screw 330 is rotated, and advances relative to the screw 330 to an open position (refer to FIG. 1) at which the flow path of the molding material is open. Accordingly, the molding material is fed forward of the screw 330.

The backflow prevention ring 331 may be of either a co-rotation type rotating together with the screw 330 or a non-co-rotation type that does not rotate together with the screw 330.

The injection unit 300 may have a drive source that causes the backflow prevention ring 331 to advance and retreat with respect to the screw 330 between the open position and the close position.

The plasticizing motor 340 rotates the screw 330. The drive source for rotating the screw 330 is not limited to the plasticizing motor 340, and may be a hydraulic pump, for example.

The injection motor 350 causes the screw 330 to advance and retreat. A motion conversion mechanism that converts a rotary motion of the injection motor 350 into a linear motion of the screw 330 or the like is provided between the injection motor 350 and the screw 330. For example, the motion conversion mechanism has a screw shaft and a screw nut screwed to the screw shaft. A ball or a roller may be provided between the screw shaft and the screw nut. A drive source that causes the screw 330 to advance and retreat is not limited to the injection motor 350, and may be a hydraulic cylinder, for example.

The load detector 360 measures a load transmitted between the injection motor 350 and the screw 330. The measured load is converted into a pressure by the control device 700. The load detector 360 is provided in a load transmission channel between the injection motor 350 and the screw 330, and measures the load acting on the load detector 360.

The load detector 360 transmits a signal of the measured load to the control device 700. The load measured by the load detector 360 is converted into the pressure acting between the screw 330 and the molding material, and is used in controlling or monitoring the pressure received from the molding material by the screw 330, a back pressure against the screw 330, or the pressure acting on the molding material from the screw 330.

A pressure detector for measuring the pressure of the molding material is not limited to the load detector 360, and a general detector can be used. For example, a nozzle pressure sensor or a mold internal pressure sensor may be used. The nozzle pressure sensor is installed in the nozzle 320. The mold internal pressure sensor is installed inside the mold unit 800.

The injection unit 300 performs a plasticizing process, a filling process, and a holding pressure process under the control of the control device 700. The filling process and the holding pressure process may be collectively referred to as an injection process.

In the plasticizing process, the plasticizing motor 340 is driven to rotate the screw 330 at a set rotational speed such that the molding material is fed forward along the helical groove of the screw 330. As a result, the molding material is gradually melted. As the liquid molding material is fed forward of the screw 330 and is accumulated in a front portion of the cylinder 310, the screw 330 retreats. For example, a rotational speed of the screw 330 is measured by using a plasticizing motor encoder 341. The plasticizing motor encoder 341 measures the rotation of the plasticizing motor 340, and transmits a signal indicating a measurement result thereof to the control device 700. A screw rotational speed detector for measuring the rotational speed of the screw 330 is not limited to the plasticizing motor encoder 341, and a general detector can be used.

In the plasticizing process, the injection motor 350 may be driven to apply a set back pressure to the screw 330 in order to limit a sudden retreat of the screw 330. The back pressure applied to the screw 330 is measured by using the load detector 360, for example. When the screw 330 retreats to a plasticizing completion position and a predetermined amount of the molding material is accumulated in front of the screw 330, the plasticizing process is completed.

The position and the rotational speed of the screw 330 in the plasticizing process are collectively set as a series of setting conditions. For example, a plasticizing start position, a rotational speed switching position, and a plasticizing completion position are set. These positions are aligned in this order from the front side toward the rear side, and represent the start point and the end point of the section in which the rotational speed is set. The rotational speed is set for each section. The number of the rotational speed switching positions may be one or more. The rotational speed switching position may not be set. In addition, the back pressure is set for each section.

In the filling process, the injection motor 350 is driven to cause the screw 330 to advance at a set movement speed, and the cavity space 801 inside the mold unit 800 is filled with the liquid molding material accumulated in front of the screw 330. The position or the movement speed of the screw 330 is measured by using an injection motor encoder 351, for example. The injection motor encoder 351 measures the rotation of the injection motor 350, and transmits a signal indicating a measurement result thereof to the control device 700. When the position of the screw 330 reaches a set position, the filling process is switched to the holding pressure process (so-called V/P switching). The position where the V/P switching is performed will be referred to as a V/P switching position. The set movement speed of the screw 330 may be changed in accordance with the position, a time, or the like of the screw 330.

The position and the movement speed of the screw 330 in the filling process are collectively set as a series of setting conditions. For example, a filling start position (also referred to as an "injection start position"), the movement speed switching position, and the V/P switching position are set. These positions are aligned in this order from the rear side toward the front side, and represent the start point and the end point of the section in which the movement speed is set. The movement speed is set for each section. The number of the movement speed switching positions may be one or more. The movement speed switching position may not be set.

An upper limit of the pressure of the screw 330 is set for each section in which the movement speed of the screw 330 is set. The pressure of the screw 330 is measured by the load detector 360. In a case where the pressure of the screw 330 is equal to or lower than a setting pressure, the screw 330 advances at a set movement speed. On the other hand, in a case where the pressure of the screw 330 exceeds the setting pressure, in order to protect the mold, the screw 330 is caused to advance at a movement speed slower than the set movement speed so that the pressure of the screw 330 is equal to or lower than the setting pressure.

After the position of the screw 330 reaches the V/P switching position in the filling process, the screw 330 may be temporarily stopped at the V/P switching position, and thereafter, the V/P switching may be performed. Immediately before the V/P switching, instead of stopping the screw 330, the screw 330 may be caused to advance at a low speed, or may be caused to retreat at a low speed. In addition, a screw position detector for measuring the position of the screw 330 and a screw movement speed detector for measuring the movement speed of the screw 330 are not limited to the injection motor encoder 351, and a general detector can be used.

In the holding pressure process, the injection motor 350 is driven to press the screw 330 forward. A pressure (hereinafter, also referred to as a "holding pressure") of the molding material in the front end portion of the screw 330 is held at a setting pressure, and the molding material remaining inside the cylinder 310 is pressed toward the mold unit 800. An insufficient amount of the molding material due to cooling shrinkage inside the mold unit 800 can be replenished. The holding pressure is measured by using the load detector 360, for example. A set value of the holding pressure may be changed depending on an elapsed time from the start of the holding pressure process. A plurality of holding pressures and a plurality of holding times for holding the holding pressures in the holding pressure process may be respectively set, or may be collectively set as a series of setting conditions.

In the holding pressure process, the molding material in the cavity space 801 inside the mold unit 800 is gradually cooled, and when the holding pressure process is completed, an inlet of the cavity space 801 is closed by the solidified molding material. This state is referred to as gate seal, and prevents the backflow of the molding material from the cavity space 801. After the holding pressure process, a cooling process starts. In the cooling process, the molding material inside the cavity space 801 is solidified. In order to shorten a molding cycle time, the plasticizing process may be performed during the cooling process.

The injection unit 300 of the present embodiment is of an in-line screw type, but may be of a pre-plasticizing type. The injection unit of the pre-plasticizing type supplies the molding material melted inside a plasticizing cylinder to an injection cylinder, and the molding material is injected into the mold unit from the injection cylinder. Inside the plasticizing cylinder, the screw is disposed to be rotatable and not to be able to advance and retreat, or the screw is disposed to be rotatable and to be able to advance and retreat. On the other hand, a plunger is disposed to be able to advance and retreat inside the injection cylinder.

In addition, the injection unit 300 of the present embodiment is of a horizontal type in which the axial direction of the cylinder 310 is a horizontal direction, but may be of a vertical type in which the axial direction of the cylinder 310 is an upward-downward direction. The mold clamping unit combined with the injection unit 300 of the vertical type may be of the vertical type or the horizontal type. Similarly, the mold clamping unit combined with the injection unit 300 of the horizontal type may be of the horizontal type or the vertical type.

Moving Unit

In describing the moving unit 400, similarly to the description of the injection unit 300, a moving direction of the screw 330 during the filling (for example, the negative direction of the X-axis) will be defined as forward, and a moving direction of the screw 330 during the plasticizing (for example, the positive direction of the X-axis) will be defined as rearward.

The moving unit 400 causes the injection unit 300 to advance and retreat with respect to the mold unit 800. The moving unit 400 presses the nozzle 320 against the mold unit 800, thereby generating a nozzle touch pressure. The moving unit 400 includes a hydraulic pump 410, a motor 420 serving as a drive source, and a hydraulic cylinder 430 serving as a hydraulic actuator.

The hydraulic pump 410 has a first port 411 and a second port 412. The hydraulic pump 410 is a pump that can rotate in both directions, and switches rotation directions of the motor 420 such that a hydraulic fluid (for example, oil) is suctioned from any one of the first port 411 and the second port 412, and is discharged from the other to generate a hydraulic pressure. The hydraulic pump 410 can suction the hydraulic fluid from a tank, and can discharge the hydraulic fluid from any one of the first port 411 and the second port 412.

The motor 420 operates the hydraulic pump 410. The motor 420 drives the hydraulic pump 410 in a rotation direction and with a rotation torque in accordance with a control signal transmitted from the control device 700. The motor 420 may be an electric motor, or may be an electric servo motor.

The hydraulic cylinder 430 has a cylinder body 431, a piston 432, and a piston rod 433. The cylinder body 431 is fixed to the injection unit 300. The piston 432 partitions the inside of the cylinder body 431 into a front chamber 435 serving as a first chamber and into a rear chamber 436 serving as a second chamber. The piston rod 433 is fixed to the stationary platen 110.

The front chamber 435 of the hydraulic cylinder 430 is connected to the first port 411 of the hydraulic pump 410 via a first flow path 401. The hydraulic fluid discharged from the first port 411 is supplied to the front chamber 435 via the first flow path 401, whereby the injection unit 300 is pressed forward. The injection unit 300 advances, and the nozzle 320 is pressed against the stationary mold 810. The front chamber 435 functions as a pressure chamber that generates the nozzle touch pressure of the nozzle 320 by means of the pressure of the hydraulic fluid supplied from the hydraulic pump 410.

On the other hand, the rear chamber 436 of the hydraulic cylinder 430 is connected to the second port 412 of the hydraulic pump 410 via a second flow path 402. The hydraulic fluid discharged from the second port 412 is supplied to the rear chamber 436 of the hydraulic cylinder 430 via the second flow path 402, whereby the injection unit 300 is pressed rearward. The injection unit 300 retreats, and the nozzle 320 is separated from the stationary mold 810.

In the present embodiment, the moving unit 400 includes the hydraulic cylinder 430, but the present invention is not limited thereto. For example, instead of the hydraulic cylinder 430, an electric motor and a motion conversion mechanism that converts a rotary motion of the electric motor into a linear motion of the injection unit 300 may be used.

Control Device

For example, the control device 700 is configured to include a computer, and has a central processing unit (CPU) 701, a storage medium 702 such as a memory, an input interface 703, an output interface 704, and a communication interface 705 as shown in FIGS. 1 and 2. The control device 700 performs various types of control by causing the CPU 701 to execute a program stored in the storage medium 702. In addition, the control device 700 receives a signal from the outside through the input interface 703, and transmits the signal to the outside through the output interface 704. Furthermore, the control device 700 may transmit and receive information to and from a management device 20 (see FIG. 3) using the communication interface 705.

The control device 700 repeatedly performs the plasticizing process, the mold closing process, the pressurizing process, the mold clamping process, the filling process, the holding pressure process, the cooling process, the depressurizing process, the mold opening process, and the ejection process, thereby repeatedly manufacturing the molding product. A series of operations for obtaining the molding product, for example, an operation from the start of the plasticizing process to the start of the subsequent plasticizing process, will be referred to as a "shot" or a "molding cycle". In addition, a time required for one shot will be referred to as a "molding cycle time" or a "cycle time".

For example, one molding cycle has the plasticizing process, the mold closing process, the pressurizing process, the mold clamping process, the filling process, the holding pressure process, the cooling process, the depressurizing process, the mold opening process, and the ejection process in this order. The order described here is the order of the start times of the respective processes. The filling process, the holding pressure process, and the cooling process are performed during the mold clamping process. The start of the mold clamping process may coincide with the start of the filling process. The completion of the depressurizing process coincides with the start of the mold opening process.

A plurality of processes may be performed at the same time in order to shorten the molding cycle time. For example, the plasticizing process may be performed during the cooling process of the previous molding cycle or may be performed during the mold clamping process. In this case, the mold closing process may be performed in an initial stage of the molding cycle. In addition, the filling process may start during the mold closing process. In addition, the ejection process may start during the mold opening process. In a case where an on-off valve for opening and closing the flow path of the nozzle 320 is provided, the mold opening process may start during the plasticizing process. The reason is as follows. Even when the mold opening process starts during the plasticizing process, when the on-off valve closes the flow path of the nozzle 320, the molding material does not leak from the nozzle 320.

One molding cycle may include a process other than the plasticizing process, the mold closing process, the pressurizing process, the mold clamping process, the filling process, the holding pressure process, the cooling process, the depressurizing process, the mold opening process, and the ejection process.

For example, after the holding pressure process is completed and before the plasticizing process starts, a pre-plasticizing suck-back process of causing the screw 330 to retreat to a preset plasticizing start position may be performed. The pressure of the molding material accumulated in front of the screw 330 before the plasticizing process starts can be reduced, and a sudden retreat of the screw 330 when the plasticizing process starts can be prevented.

In addition, after the plasticizing process is completed and before the filling process starts, a post-plasticizing suck-back process may be performed in which the screw 330 is caused to retreat to a preset filling start position (also referred to as an "injection start position"). The pressure of the molding material accumulated in front of the screw 330 before the filling process starts can be reduced, and a leakage of the molding material from the nozzle 320 before the filling process starts can be prevented.

The control device 700 is connected to an operation device 750 that receives an input operation of a user, and a display device 760 that displays a screen. For example, the operation device 750 and the display device 760 may be integrated with each other in a form of a touch panel 770. The touch panel 770 serving as the display device 760 displays the screen under the control of the control device 700. For example, the screen of the touch panel 770 may display settings of the injection molding machine 10, and information on a current state of the injection molding machine 10. The touch panel 770 can receive an operation in a displayed screen region. In addition, for example, the screen region of the touch panel 770 may display a button for accepting the input operation of the user or an operation portion such as an input field. The touch panel 770 serving as the operation device 750 detects an input operation of the user on the screen, and outputs a signal corresponding to the input operation to the control device 700. In this manner, for example, while confirming information displayed on the screen, the user can perform settings (including an input of a set value) of the injection molding machine 10 by operating the operation portion provided on the screen. In addition, the user can operate the injection molding machine 10 corresponding to the operation portion by operating the operation portion provided on the screen. For example, the operation of the injection molding machine 10 may be an operation (including stopping) of the mold clamping unit 100, the ejector unit 200, the injection unit 300, the moving unit 400, or the like. In addition, the operation of the injection molding machine 10 may be switching between the screens displayed on the touch panel 770 serving as the display device 760.

A case has been described in which the operation device 750 and the display device 760 of the present embodiment are integrated with each other as the touch panel 770. However, both of these may be independently provided. In addition, a plurality of the operation devices 750 may be provided. The operation device 750 and the display device 760 are disposed on the operation side (a negative direction of the Y-axis) of the mold clamping unit 100 (more specifically, the stationary platen 110). For example, the operation device 750 can receive an input of a numerical value or of text from a physically provided button, a software keyboard displayed on the display device 760, or the like.

Embodiment

Figure 3:
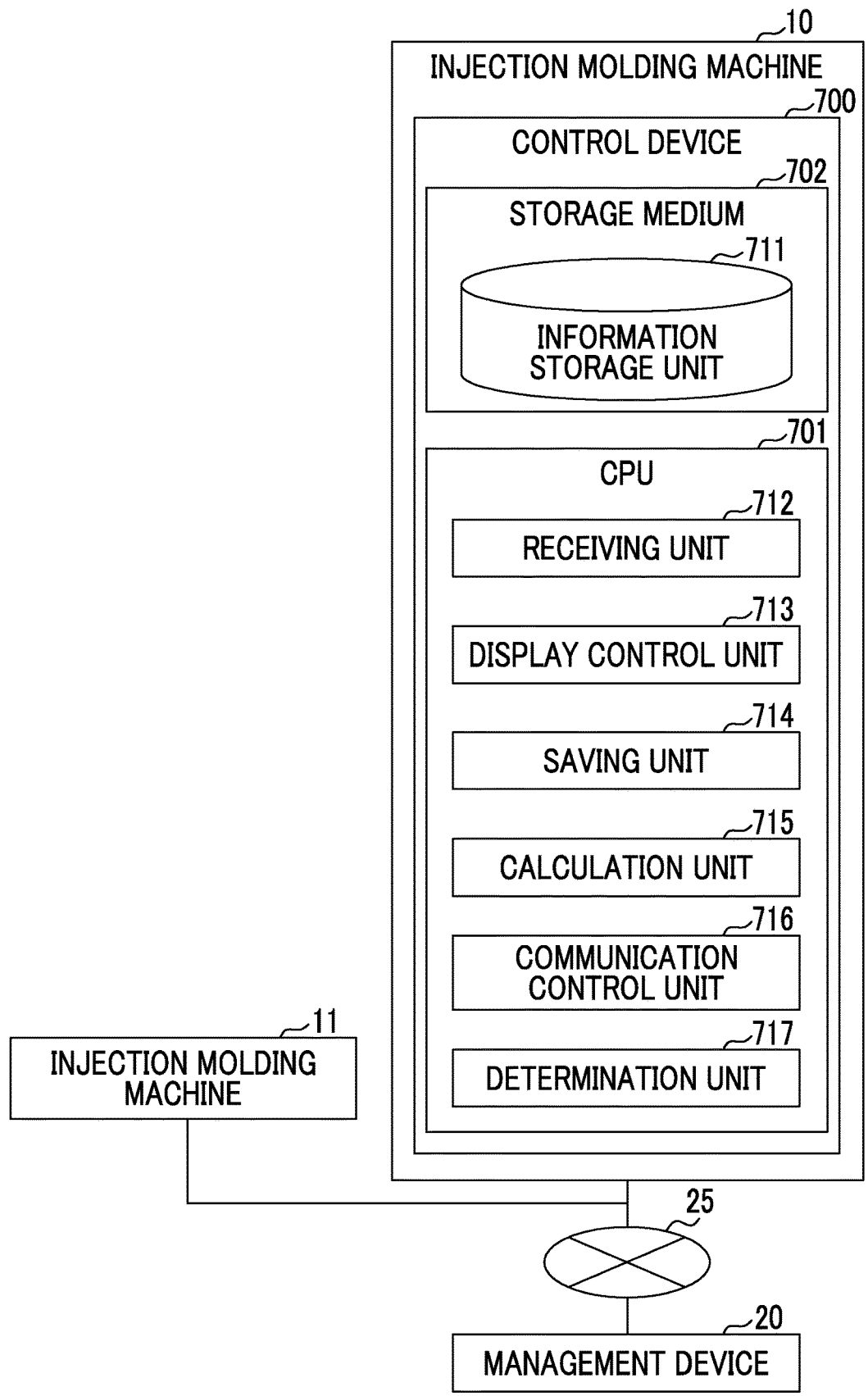
FIG. 3 is a functional block diagram showing components of a control device of the injection molding machine according to the embodiment.

FIG. 3 is a functional block diagram showing components of the control device 700 of the injection molding machine 10 according to the embodiment.

The injection molding machine 10 is connected to the management device 20 so as to be capable of bidirectional communication via an injection molding machine 11 or a communication network 25. In addition, the management device 20 is also connected to each of the injection molding machine 10 and the injection molding machine 11 so as to be capable of bidirectional communication. The injection molding machine 11 has the same configuration as the injection molding machine 10, and description thereof will be omitted.

The management device 20 receives setting information, actual result information, and the like of injection molding performed by the injection molding machine 10 from the communication interface 705 of the control device 700. Accordingly, the management device 20 can display the same screen as that of the injection molding machine 10. Furthermore, the management device 20 can receive the same operation as that of the control device 700. The management device 20 can transmit to the injection molding machine 10 a display according to the received operation and a control command according to the received operation. Accordingly, the management device 20 can perform the same processing as that of the injection molding machine 10 described below.

Each functional block of the CPU 701 of the control device 700 shown in FIG. 3 is conceptual, and may not necessarily be configured to be physical as shown. All or a portion of each functional block can be configured to be functionally or physically distributed and integrated in any desired unit. Each processing function performed in each functional block is realized by a program in which all or any desired partial functions are performed by the CPU 701. Alternatively, each functional block may be realized as hardware using a wired logic. As shown in FIG. 3, the CPU 701 of the control device 700 includes a receiving unit 712, a display control unit 713, a saving unit 714, a calculation unit 715, a communication control unit 716, and a determination unit 717. The control device 700 further includes an information storage unit 711 in the storage medium 702.

The information storage unit 711 stores log information showing setting information set by the user, actual values obtained by various sensors, and monitoring results or statistical values obtained by the control device 700.

The display control unit 713 controls displaying of data such as a display screen on the touch panel 770. The display control unit 713 according to the present embodiment may output the display screen including, for each process of molding by the injection molding machine 10, setting information set by the user in the process, or waveform data representing changes in actual values measured in the process as waveforms, to the touch panel 770. In the present embodiment, an example of outputting the display screen or the like to the touch panel 770 will be described, but the destination to which data is output is not limited to the touch panel 770. For example, the display control unit 713 may output data such as the display screen to an information processing device (for example, the management device 20) connected via a network.

In the present embodiment, a case where an operation is performed on the display screen displayed on the touch panel 770 of the injection molding machine 10 will be described. The injection molding machine 10 according to the present embodiment can receive a selection of a certain region displayed on the touch panel 770 and an input of a numerical value or of text through the operation device 750 of the touch panel 770.

For example, the display control unit 713 according to the present embodiment displays a log information screen that displays actual values, setting information, statistical values, and the like during molding as log information.

The user can recognize a current state of the injection molding machine 10 by referring to the statistical value (an example of statistical information) displayed on the log information screen. However, the injection molding machine 10 has an unstable state regardless of the setting. Therefore, when confirming the current state of the injection molding machine 10, there are actual values that are preferably excluded from the statistical values.

For example, immediately after the injection molding machine 10 is started, data tends to be unstable. In addition, in a case where the injection molding is stopped for a short period of time in order to clean the injection molding machine 10, it is preferable that data indicated by shot numbers including the stop time are not included in the statistical values. In addition, in a case where there is data that the user wants to exclude from the statistical values, it may be difficult for the user to specify the shot number corresponding to the data to be excluded. Therefore, in the present embodiment, the display control unit 713 displays various kinds of information (for example, time information) related to an injection molding cycle together with the shot number on the log information screen. Here, the time information includes the time related to injection such as injection start or end expressed in a form such as YYMMDDhhmmss, YYMMDDhhmm, or YYMMDDhh, and information on periods such as morning and afternoon in addition to YYMMDD. Furthermore, the receiving unit 712 may receive a selection operation for the various kinds of information (for example, time information). For example, data of the shot number corresponding to the various kinds of information (for example, time information) for which the selection operation is received is used as a target to be excluded. Accordingly, in the present embodiment, it becomes easy to specify the data to be excluded (for example, the data indicated by the shot number). Therefore, in the present embodiment, by receiving the selection operation for the shot number or for the time information on the log information screen, it is possible to set whether or not to include actual values and setting information in statistical values for each shot or each time information.

For example, the display control unit 713 displays an input field for specifying a calculation target of a statistical value based on an actual value (an example of a parameter related to the injection molding) or setting information (an example of the parameter related to the injection molding) obtained when a molding product is manufactured by performing the injection molding. To the input field, a shot number indicating an injection molding cycle can be input, or time information in which the injection molding cycle is performed may be input.

The receiving unit 712 receives an operation of the user from the touch panel 770 via the input interface 703. For example, the receiving unit 712 receives the input of the shot number or of the time information input to the input field.

The calculation unit 715 calculates a statistical value based on the shot number input to the input field, the actual value obtained in the time information, and the setting information.

Then, the display control unit 713 displays the statistical value calculated by the calculation unit 715 on the log information screen.

The saving unit 714 stores the actual values, setting information, calculated statistical values, and the like during molding, in the information storage unit 711 as log information. Settings for saving as log information are made on the log information screen displayed by the display control unit 713.

In addition, the communication control unit 716 transmits the shot number or time information received by the receiving unit 712 to an external device (for example, the injection molding machine 11). Accordingly, the shot number or time information to be excluded from the statistical values can be shared among a plurality of the injection molding machines 10 and 11.

The determination unit 717 determines whether or not the shot number or the time period has to be excluded from the calculation target of the statistical information based on the actual values obtained when manufacturing the molding product and on the setting information (an example of the parameter) for each shot number indicating the injection molding cycle. A specific determination method will be described later.

FIG. 4 is a view illustrating the log information screen output by the display control unit 713 according to the present embodiment.

In a log information screen 1400 shown in FIG. 4, a total number 1401, a number of non-defective products 1402, a number of defective products 1403, a number of rejects 1404, a logging button 1405, a monitoring setting button 1406, a save button 1407, an update button 1408, a statistics list 1420, an actual result list 1430, and a statistical target setting field 1440 are shown. The log information screen 1400 shown in FIG. 4 is a screen displayed in a case where a tab "actual result" 1491 shown in the lower field of the screen is selected.

The statistics list 1420 shows statistical values (for example, average, range, maximum, minimum, and standard deviation) for each of setting fields 1421 to 1428. Contents shown in the setting fields 1421 to 1428 can be set by the user. In the present embodiment, it is possible to display and monitor the items shown in the setting fields 1421 to 1428 and to save log information. The monitoring of the present embodiment represents a determination of whether or not the molding product is a non-defective product based on a predetermined criterion.

"Monitoring", "center", and "range" in the statistics list 1420 are information for determining whether or not the molding product is defective in the setting field.

It is shown that the control device 700 does not perform monitoring in a case where the monitoring of the statistics list 1420 is "OFF" and that the control device 700 performs monitoring in a case of "ON". In the case of "ON", the control device 700 determines whether or not a measured actual value in the item shown in the setting field satisfies the criteria shown in "center" and "range". Switching of the monitoring is performed by pressing the monitoring setting button 1406.

"Defective" in the statistics list 1420 represents the number of molding products that do not satisfy the criteria shown in "center" and "range".

"Cycle time" in the setting field 1421, "filling time" in the setting field 1422, and "plasticizing time" in the setting field 1423 are items set to monitor times required for a cycle, filling, and plasticizing.

"Minimum cushion position" in the setting field 1424 is an item set to monitor a position when the screw 330 is moved to a frontmost position when pressure is applied to the mold unit 800 after the mold unit 800 is filled with the molding material. "Filling peak pressure" in the setting field 1425 is an item set to monitor a peak value of the pressure when the molding material is filled. "Entire region peak pressure" in the setting field 1426 is an item set to monitor a peak value of the pressure in all the processes of the injection molding machine 10. "Holding pressure completion position" in the setting field 1427 is an item set to monitor the position of the screw 330 when the holding pressure is completed. "Mold clamping force" in the setting field 1428 is an item set to monitor a maximum value of the mold clamping force measured as the actual value.

The setting fields 1421 to 1428 can be changed to items that the user wants to monitor. Description of a changing method will be omitted.

The actual result list 1430 shows a list of the setting information in the items set in the setting fields 1421 to 1428 or the actual values measured by various sensors, for each shot. The items set in the setting fields 1421 to 1428 are set from "CH-1" to "CH-8". In addition, for each shot, a "shot number", a "time" of injection molding, and a "state" of injection molding are associated with each other as information indicating the shot.

The logging button 1405 is a button for accepting whether or not at least one of set values and the actual values shown in the actual result list 1430 is to be saved as the log information. In a case where the logging button 1405 is pressed (displayed as "LOGGING ON"), the saving unit 714 saves the information or the like shown in the actual result list 1430 in the storage medium 702 as log information.

The monitoring setting button 1406 is a button for accepting whether or not monitoring is to be performed according to the item monitored in the statistics list 1420. In a case where the monitoring setting button 1406 is pressed (displayed as "MONITORING ON"), whether or not the molding product is a defective product is monitored for each shot, and the monitoring result is included in the log information. The monitoring of the statistics list 1420 is switched to "OFF" or "ON" depending on whether or not the monitoring setting button 1406 is pressed.

The save button 1407 is a button for accepting whether or not to save the statistical values (for example, average, range, maximum, minimum, integral, standard deviation, and the like) for each of the setting fields 1421 to 1428. In a case where the save button 1407 is pressed, the saving unit 714 saves the statistical values for each of the setting fields 1421 to 1428 in the storage medium 702 as log information.

The update button 1408 is a button for accepting whether or not to update the statistics list 1420 and the actual result list 1430 each time the injection molding by the injection molding machine 10 is completed. In a case where the update button 1408 is pressed (displayed as "ALWAYS"), the statistics list 1420 and the actual result list 1430 are updated each time the injection molding by the injection molding machine 10 is completed.

The total number 1401 shows the number of molding products molded in the injection molding machine 10. The number of non-defective products 1402 indicates the number of molding products determined to be non-defective products based on "monitoring", "center", and "range". The number of defective products 1403 indicates the number of molding products determined to be defective products based on the "monitoring", "center", and "range". The number of rejects 1404 shows the number of rejected molding products.

The statistical target setting field 1440 includes various input fields for setting calculation targets of statistical information.

The statistical information is information calculated based on the actual values (an example of the parameter) obtained each time a molding product is manufactured by performing injection molding with the injection molding machine 10, and includes, for example, average, range, maximum, minimum, and standard deviation calculated for each of the setting fields 1421 to 1428 in the statistics list 1420. In addition, in the present embodiment, an example of the statistical information is shown, and statistical information other than the average, range, maximum, minimum, and standard deviation may also be shown. In addition, the items for which the statistical information is calculated are not limited to the items set in the setting fields 1421 to 1428, and may be other items.

The statistical target setting field 1440 includes three check boxes. Specifically, a first check box 1441 for setting the latest data, a second check box 1443 for setting the calculation targets of the statistical information, and a third check box 1445 for exclusion from the calculation targets of the statistical information are included.

The first check box 1441 is a check box for setting whether or not the latest data is to be used as the calculation target of the statistical information.

An input field 1442 for the latest data is a field in which a numerical value indicating the number of shots can be input. In a case where the receiving unit 712 receives a check of the first check box 1441, the receiving unit 712 receives the input of the numerical value input to the input field 1442 as the number of shots for calculating the statistical information.

Accordingly, in the present embodiment, the calculation unit 715 calculates the statistical information from the log information corresponding to the input number of shots from the latest data.

The second check box 1443 is a check box for setting whether or not the statistical information is to be used as the calculation target within a range set by the user.

An input field 1444A to an input field 1444B for shot numbers are fields to which shot numbers can be input as a calculation range of the statistical information. In a case where the receiving unit 712 receives a check of the second check box 1443, the receiving unit 712 receives the input of the range of the shot numbers input to the input field 1444A to the input field 1444B.

The calculation unit 715 calculates statistical information by including actual values (an example of the parameter) obtained by the injection molding in the range of the shot numbers input to the input field 1444A to the input field 1444B as the calculation targets.

The third check box 1445 is a check box for setting whether or not to exclude a range set by the user from the calculation targets of the statistical information.

An input field 1446A to an input field 1446B for exclusion numbers are fields to which shot numbers can be input as a range to be excluded from the calculation targets of the statistical information. In a case where the receiving unit 712 receives a check of the third check box 1445, the receiving unit 712 receives the input of the range of the shot numbers input to the input field 1446A to the input field 1446B.

The calculation unit 715 calculates the statistical information after excluding actual values (an example of the parameter) obtained by the injection molding in the range of the shot numbers input to the input field 1446A to the input field 1446B. For example, the calculation unit 715 calculates the statistical information by excluding the actual values in the input range from the actual values obtained by the injection molding after the measurement is started by the injection molding machine 10.

In addition, in a case where all the check boxes 1441, 1443, and 1445 described above are not checked, all the actual values obtained by the injection molding after the measurement is started by the injection molding machine 10 are used as the calculation targets of the statistical information. In addition, a plurality of the check boxes 1441, 1443, and 1445 may be set at the same time. For example, a first range of shot numbers to be used as the calculation targets is set by receiving the check of the second check box 1443. Then, by receiving the check of the third check box 1445, a second range of shot numbers to be excluded from the first range may be set.

In addition, in the example shown in FIG. 4, an example in which a range of shot numbers is input has been described. However, the setting of the range for calculating statistical information is not limited to the shot numbers. For example, an input field in which a time period (for example, a start time and an end time designated as a range, or time information that includes many shots such as YYMMDD or YYMMDDhh) as a range for calculating statistical information can be set may be displayed. In a case where the receiving unit 712 receives an input of a time period to the input field, a shot with time information included in the time period input to the input field may be used as the calculation target of the statistical information as in the range of the shot numbers, or may be excluded from the calculation targets of the statistical information.

The saving unit 714 according to the present embodiment saves the actual values and the like from various sensors in the information storage unit 711 according to the settings of the log information screen as described above.

In the above-described embodiment, an example has been described in which the statistical target setting field 1440 for setting the calculation target of the statistical information is provided on the log information screen. However, the present embodiment is not limited to the method of providing the statistical target setting field 1440 for setting the calculation target of the statistical information on the log information screen. As a modification example, a method of providing a statistical target setting screen as a separate screen from the log information screen can be considered.

Figure 5:
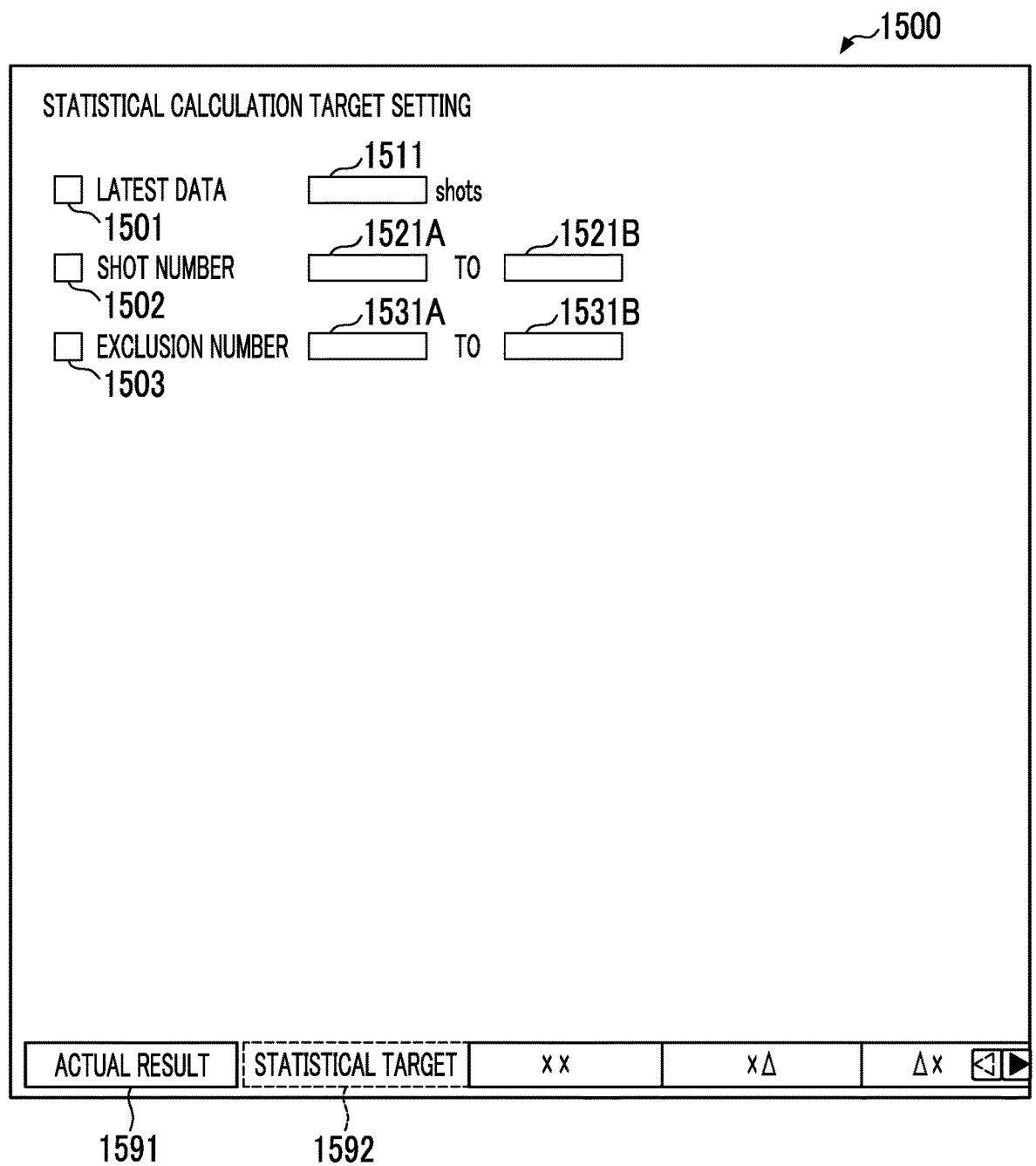
FIG. 5 is a view illustrating a statistical target setting screen output by the display control unit according to a modification example.

FIG. 5 is a view illustrating a statistical target setting screen output by the display control unit 713 according to the present modification example.

A statistical target setting screen 1500 illustrated in FIG. 5 is a screen displayed in a case where a tab "statistical target" 1592 shown in the lower field of the screen is selected. In a case where a tab "actual result" 1591 is selected, a screen is displayed in which the statistical target setting field 1440 is removed from the log information screen 1400 shown in FIG. 4.

The statistical target setting screen 1500 includes a first check box 1501, a second check box 1502, a third check box 1503, an input field 1511 for the latest data, an input field 1521A to an input field 1521B for shot numbers, and an input field 1531A to an input field 1531B for exclusion numbers.

The first check box 1501, the second check box 1502, and the third check box 1503 in FIG. 5 correspond to the first check box 1441, the second check box 1443, and the third check box 1445 in FIG. 4, so that description thereof will be omitted.

Similarly, the input field 1511 for the latest data, the input field 1521A to the input field 1521B for shot numbers, and the input field 1531A to the input field 1531B for exclusion numbers correspond to the input field 1442 for the latest data, the input field 1444A to the input field 1444B for shot numbers, and the input field 1446A to the input field 1446B for exclusion numbers, so that description thereof will be omitted.

The receiving unit 712 receives an input of information (for example, a range of shot numbers) for specifying the calculation targets of the statistical information on the statistical target setting screen 1500, and then receives a selection of the tab "actual result" 1591. In this case, the calculation unit 715 calculates the statistical information using actual values (an example of the parameter) obtained in the range of the input shot numbers. Then, the display control unit 713 displays the log information screen based on the calculated statistical information.

In the above-described embodiment and modification example, an example of setting the calculation targets of statistical information in the statistical target setting field 1440 and on the statistical target setting screen 1500 has been described. However, in the present embodiment, a method of setting the calculation targets of the statistical information is not limited to the above-described method. For example, the calculation targets of the statistical information may be set from a record for each shot shown in the actual result list 1430.

FIG. 6 is a view illustrating another aspect of the actual result list included in the log information screen output by the display control unit 713 according to the present embodiment.

In an actual result list 1630 shown in FIG. 6, in a record for each shot, actual values obtained in the shot are set. In addition, in the actual result list 1630, a check box 1631 is provided for each shot number.

The check box 1631 for each shot number is a check box for setting whether or not to include the actual values indicated in the record as the calculation target of the statistical information.

As described above, the display control unit 713 displays the actual result list 1630 showing the result of the injection molding performed for each shot number, and displays the check box 1631 for each shot number shown in the actual result list 1630. That is, the display control unit 713 displays the actual values of the injection molding indicated by the shot number by means of the check box 1631 for each shot number so as to be selectable as the calculation target of the statistical information.

In the example illustrated in FIG. 6, actual values of shot numbers indicated by check boxes 1631A, 1631B, 1631C, 1631D, 1631E, and 1631F checked in the actual result list 1630 are included in the calculation targets of the statistical information.

In addition, in the example illustrated in FIG. 6, an example in which the calculation target of the statistical information is determined by checking the check box 1631 in the actual result list 1630 has been described. However, the present embodiment is not limited to the example in which the actual values of the checked shot number are included in the calculation targets, and the actual values of the checked shot number may be excluded from the calculation targets.

In addition, the method of setting the calculation targets of the statistical information in the actual result list 1630 is not limited to the check by the check boxes.

FIG. 7 is a view illustrating another aspect of the actual result list included in the log information screen output by the display control unit 713 according to the present embodiment.

In the example shown in FIG. 7, in an actual result list 1730, the receiving unit 712 receives a selection of a range 1731 via an operation of the operation device 750.

As described above, actual values included in the range 1731 selected by the user are included in the calculation targets of the statistical information. When the selection of the range 1731 is received by the operation of the operation device 750, the display control unit 713 may display check numbers corresponding to the range 1731 for which the selection is received in the input field 1444A to the input field 1444B in FIG. 4.

As described above, various aspects can be considered as the method of setting the calculation targets of the statistical information. The above-described method shows an example of the method of setting the calculation targets of statistical information, and calculation targets of statistical information may also be set according to another aspect.

As another method, candidates that are determined to be excluded from the calculation targets by the control device 700 may be presented to the user in a selectable manner so as to allow the user to set the calculation targets of the statistical information.

The determination unit 717 determines, for each shot number, whether or not the candidate has to be excluded from the calculation targets. Any method may be used as a determination method. For example, there is a method using an average and a standard deviation. For example, in a case where an actual value of a shot number deviates from the average by three times or more of the value of the standard deviation, the determination unit 717 determines that a record number of the actual value is a candidate to be excluded from the calculation targets. In addition, in the present embodiment, another method may be used.

As another method, quartiles may be used. The determination unit 717 arranges the actual values in order from the largest for each item, and determines the actual value corresponding to ¼ and ¾ of the whole. Then, these two data items are referred to as an upper quartile and a lower quartile. The determination unit 717 may add 1.5 times the difference between these two quartiles to the upper quartile, and determine an actual value larger than the resultant as a candidate to be excluded from the calculation targets. Furthermore, the determination unit 717 may subtract 1.5 times the difference between these two quartiles from the lower quartile, and determine an actual value smaller than the resultant as a candidate to be excluded from the calculation targets.

In addition, the display control unit 713 may display the shot number determined to be a candidate to be excluded, for the user in a selectable manner.

FIG. 8 is a view illustrating another aspect of the log information screen output by the display control unit 713 according to the present embodiment. As in FIG. 6, an actual result list 1930 of a log information screen 1900 shown in FIG. 8 is provided with a check box 1631 for each shot number.

In the actual result list 1930, the display control unit 713 causes colors of cells 1931 and 1933 for actual values determined as candidates to be excluded by the determination unit 717 to be different, and displays marks 1932 and 1934 indicating that the cells have to be excluded, in the vicinity of the shot numbers.

In a case where the receiving unit 712 receives checks of check boxes 1936A and 1936B in which the marks 1932 and 1934 are indicated, the calculation unit 715 excludes the actual values of the checked shot numbers and calculates the statistical information. Then, the display control unit 713 displays the calculated statistical information in the statistics list 1420.

In addition, a candidate to be excluded may be specified from the statistics list 1420 displayed on the display control unit 713. For example, the display control unit 713 may display a maximum value and a minimum value for each item shown in the setting fields in the statistics list 1420 in a selectable manner. For example, the receiving unit 712 receives a selection of a minimum value 1921 of the "cycle time" shown in the setting field 1421. In this case, in the actual result list 1930, the display control unit 713 displays a color of a cell 1935 for an actual value corresponding to the minimum value 1921 for which the selection is received, to be different.

Accordingly, the user can recognize the shot number in which the actual value of the "cycle time" is the minimum value "0.00". In addition, in a case where the receiving unit 712 receives a check of a check box 1936C, the calculation unit 715 can calculate the statistical information by excluding the actual value of the shot in which the actual value of the "cycle time" is the minimum value "0.00" from the calculation targets.

In the present embodiment, displaying may be performed so that the statistical target setting field and the actual result list are interlocked with each other. For example, in a case where the receiving unit 712 receives setting of the calculation target of the statistical information or an exclusion target in the statistical target setting field, the display control unit 713 may display the actual value of the shot number set as the calculation target or the exclusion target to be recognizable.

FIG. 9 is a view illustrating the log information screen output by the display control unit 713 according to the present embodiment. A configuration of a log information screen 1800 shown in FIG. 9 is the same as that in FIG. 4, and description thereof will be omitted.

In the log information screen 1800 shown in FIG. 9, a third check box 1845 is checked in a statistical target setting field 1840. Then, a shot number "43" is set to be excluded from the calculation targets in an input field 1846A to an input field 1846B for exclusion numbers.

Then, the display control unit 713 displays a color of a record 1831 of the shot number "43" set to be excluded from the calculation target in an actual result list 1830 displayed together with the statistical target setting field 1840 to be different from those of records of other shot numbers. Accordingly, the user can recognize the actual value of the shot excluded from the calculation targets.

In the present embodiment, an example of changing a color of a record of a shot number set to be excluded from the calculation targets has been described. However, the present embodiment is not limited to the method of changing the color of the record, and a display form may be different so that the difference from other records can be identified.

Actions

The control device 700 according to the above-described embodiment and modification example displays an input field that receives an input of a shot number showing an injection molding cycle for specifying a calculation target of statistical information in a statistical target setting field or on a statistical target setting screen. In the above-described embodiment and modification example, the example in which the input of the shot number is received to specify the calculation target of the statistical information has been described. However, in order to specify an injection molding cycle as the calculation target of the statistical information, an input field that receives an input of a time period in which the injection molding cycle is performed may be displayed. As described above, the display control unit displays the input field for the shot number or for the time period. By displaying the input field, the user can exclude unstable data, in other words, data having a possibility of abnormality, from the calculation targets of the statistical information. Therefore, it is possible to observe the injection molding machine 10 using the statistical information corresponding to the current molding state. That is, the control device 700 according to the above-described embodiment and modification example can suppress a decrease in the accuracy of the statistical information by enabling the input for excluding information related to the shot having a possibility of abnormality. More specifically, monitoring during mass production of molding products in the injection molding machine 10 and identification of a current actual state are facilitated.

In addition, the control device 700 according to the above-described embodiment and modification example is provided with an input field to which a range of shot numbers to be used as the calculation targets can be input in the statistical target setting field or on the statistical target setting screen. Similarly, an input field to which a range of time periods (for example, start times and end times of times as calculation targets) to be used as the calculation targets can be input may be provided. The receiving unit receives the input of the range of shot numbers or time periods to be used as the calculation targets, whereby the range that the user wants to monitor can be set.

Furthermore, the control device 700 according to the above-described embodiment and modification example is provided with an input field to which a range of shot numbers to be excluded from the calculation targets can be input in the statistical target setting field or on the statistical target setting screen. Similarly, an input field to which a range of time periods (for example, start times and end times designated as exclusion targets) to be excluded from the calculation targets can be input may be provided. The receiving unit receives the input of the range of shot numbers or time periods to be excluded from the calculation targets, whereby the range that the user wants to monitor can be set.

That is, in response to the input of the user, the control device 700 can calculate the statistical information by excluding the unstable data from the calculation targets, or can calculate the statistical information while a predetermined setting is performed. Therefore, since the statistical information desired by the user can be displayed, monitoring of the injection molding machine 10 and identification of the current actual state are facilitated.

The control device 700 according to the above-described embodiment and modification example displays the shot number input to the input field of the statistical target setting field or of the statistical target setting screen as the calculation target or the exclusion target to have a color different from those of other shot numbers in an actual result list. Accordingly, the user can confirm the actual value corresponding to the shot number input as the calculation target or the exclusion target. Therefore, the user can determine whether or not to include the actual value indicated by the shot number in the calculation target of the statistical information. By setting the shot number or the like to be used as the calculation target according to the determination result, the accuracy of monitoring of the actual state can be improved.

The control device 700 according to the above-described embodiment and modification example includes the communication control unit 716 (an example of a transmitting unit) that transmits the range of shot numbers for which the input is received to the input field of the statistical target setting field or of the statistical target setting screen to an external device (for example, the injection molding machine 11). A transmission target is not limited to the range of shot numbers, and may be a time period. As described above, since the communication control unit 716 can transmit the range of shot numbers or time periods to the external device (for example, the injection molding machine 11), the range of shot numbers or time periods excluded from the statistical information can be shared by a plurality of devices. Therefore, an operation burden can be reduced, and monitoring of the plurality of devices (for example injection molding machines) is facilitated.

The control device 700 according to the above-described embodiment and modification example changes a display form for each shot number in the actual result list based on the determination result of the determination unit 717. Therefore, the user can determine whether or not to include the actual value indicated by the shot number in the calculation target of the statistical information. By setting the shot number or the like to be used as the calculation target according to the determination result, the accuracy of monitoring of the actual state can be improved.

In the above-described embodiment and modification example, display control and input reception in the injection molding machine 10 have been described. However, in the embodiment and the modification example, the display control and the input reception are not limited to the injection molding machine 10. For example, the management device 20 which is connected to the injection molding machine 10 to communicate with the injection molding machine 10 can perform the same control by transmitting and receiving information to and from the injection molding machine 10. Accordingly, the management device 20 can obtain the same effects as those of the injection molding machine 10.

Hitherto, the embodiments of the injection molding machine and the management device for injection molding according to the present invention have been described. However, the present invention is not limited to the above-described embodiments. Various modifications, corrections, substitutions, additions, deletions, and combinations can be made within the scope of the appended claims. As a matter of course, all of these also belong to the technical scope of the present invention.

It should be understood that the invention is not limited to the above-described embodiment, but may be modified into various forms on the basis of the spirit of the invention. Additionally, the modifications are included in the scope of the invention.

What is claimed is:

1. An injection molding machine comprising:
   one or more processors; and
   memory storing instructions thereon, the instructions when executed by the one or more processors cause the one or more processors to:
   display an input field for specifying a calculation target of statistical information based on a parameter related to injection molding,
   receive selection of one or more shot numbers or a time period via the displayed input field, wherein each of the shot numbers indicating an injection molding cycle and wherein the time period is associated with the injection molding cycle,
   determine the statistical information by processing the selected one or more shot numbers or the selected time period, and
   display the determined statistical information.

2. The injection molding machine according to claim 1, wherein the parameter obtained in the injection molding cycle indicated by the selected shot numbers, or the parameter obtained in the injection molding cycle performed in the selected time period, which is input to the input field, is included in the calculation target of the statistical information.

3. The injection molding machine according to claim 1, wherein the parameter obtained in the injection molding cycle indicated by the selected shot numbers, or the parameter obtained in the injection molding cycle performed in the selected time period, which is input to the input field, is excluded from the calculation target of the statistical information.

4. The injection molding machine according to claim 1, wherein an input of a numerical value indicating a shot number or text indicating the time period is received via the input field.

5. The injection molding machine according to claim 1, wherein the parameter obtained in the injection molding is displayed as a list represented for each shot number, and the selected shot numbers are indicated in the list to specify the calculation target of the statistical information.

6. The injection molding machine according to claim 1, wherein the parameter obtained in the injection molding cycle is displayed as a list represented for each of the shot numbers, and the list displays information of a selected shot number received via the input field in a display form different from another display form of information of another shot number.

7. The injection molding machine according to claim 1, wherein the instructions further cause the one or more processors to transmit the shot numbers or the time period received via the input field to an external device.

8. The injection molding machine according to claim 1, wherein the instructions further cause the one or more processors to:

determine whether or not the shot numbers or the time period is to be included in the calculation target of the statistical information for each of the shot numbers is, based on the parameter, display information indicating whether or not the shot numbers or the time period is to be included in the calculation target of the statistical information for each of the shot numbers, based on a determination result.

9. A management device for injection molding, comprising:

one or more processors; and memory storing instructions thereon, the instructions when executed by the one or more processors cause the one or more processors to:

display an input field for specifying a calculation target of statistical information based on a parameter related to injection molding with an injection molding machine, receive selection of one or more shot numbers or a time period via the displayed input field, wherein each of the shot numbers indicating an injection molding cycle and wherein the time period is associated with the injection molding cycle, determine the statistical information by processing the selected one or more shot numbers or the selected time period, and display the determined statistical information.

* * * * *